United States Patent [19]
Berg

[11] Patent Number: 5,842,838
[45] Date of Patent: Dec. 1, 1998

[54] STABLE WAVE MOTOR

[76] Inventor: John L. Berg, 415 Ward Dr., Oak Hill, Fla. 32759

[21] Appl. No.: 740,716

[22] Filed: Nov. 4, 1996

[51] Int. Cl.[6] .................................................. F04B 23/08
[52] U.S. Cl. ............................ 417/331; 47/333; 60/505; 290/53
[58] Field of Search .................................. 417/330, 331, 417/333; 60/398; 290/53

[56] References Cited

U.S. PATENT DOCUMENTS

| | | |
|---|---|---|
| 3,126,830 | 3/1964 | Dilliner . |
| 3,362,336 | 1/1968 | Kafka . |
| 4,277,690 | 7/1981 | Noren . |
| 4,326,840 | 4/1982 | Hicks et al. ............................ 417/331 |
| 4,421,461 | 12/1983 | Hicks et al. ............................ 417/53 |
| 4,631,921 | 12/1986 | Linderfelt ................................ 60/501 |
| 4,792,290 | 12/1988 | Berg ...................................... 47/332 |
| 5,701,740 | 12/1997 | Tveter ..................................... 60/505 |

FOREIGN PATENT DOCUMENTS 55-125364  9/1980  Japan ....................................... 290/53

*Primary Examiner*—Charles G. Freay
*Attorney, Agent, or Firm*—David Kiewit

[57] ABSTRACT

A wave motion energy harvesting apparatus of the invention comprises a float portion detachably interfitted with and axially moveable with respect to a hydrodynamically resistive portion. The float portion of this apparatus is moored by means of a line attached adjacent its vertical axis, but the hydrodynamically resistive portion is neither anchored nor moored except by its being interfitted with the float portion. Both the float and the hydrodynamically resistive portions are separately configured to have their mass distributed evenly about a common vertical axis of the apparatus. The float portion of the apparatus is nearly neutrally buoyant and comprises an automatically filled water ballast tank.

9 Claims, 4 Drawing Sheets

STABLE WAVE MOTOR

BACKGROUND OF THE INVENTION

1. Field of the Invention

This invention relates to wave-motor apparatus for converting the kinetic energy contained in waves on a body of liquid to another form and includes using wave energy to drive a reciprocating pump or a turbine.

2. Description of Prior Art

Many inventors have sought to harvest energy from the waves that are always present on a large body of water. Among the proposed devices are many using the wave energy to cause a first portion of the apparatus to move relative to a second portion of the apparatus in a reciprocating fashion. One grouping of these machines employs laterally spaced-apart floats arranged so that the up and down movements of the floats in response to the wave motion are out of phase with each other and can be used to drive a pump. Notable among machines of this sort are three disclosed by the present applicant in his issued U.S. Pat. Nos. 4,302,161, 4,413,956, and 4,792,290, the disclosures of which are herein incorporated by reference. A second grouping of these machines employs are vertically oriented comprising a float portion which floats on the surface of the body of liquid so as to be responsive to the wave motion, and a hydrodynamically resistive portion that extends beneath a surface region of wave activity for at least most of the waves to be encountered so as to be relatively stationary. The disclosure herein presented provides improvements to this latter group of devices.

Linderfelt, in U.S. Pat. No. 4,631,921, teaches a wave energy harvesting device having a conical floating member tethered within a supplemental positioning frame by a plurality of mooring lines. The supplemental positioning frame is anchored with a plurality of anchor lines.

Kafka, in U.S. Pat. No. 3,362,336, discloses several embodiments of a wave-motion device comprising a float portion and a relatively flat hydrodynamically resistive portion extending below the surface region of wave influence. One of Kafka's embodiments is a diaphragm pump attached to a larger structure (e.g., a boat) by a combination of lines and hoses connected directly to both the top and the bottom portions of the device.

Dilliner, in U.S. Pat. No. 3,126,830, discloses a vertical reciprocating wave-motion pump having the lower portion emplaced on the bottom of a body of water and a float portion that may be anchored to the bottom by a plurality of anchor lines. A clear disadvantage of Dilliner's pump, which is common with many other designs offered by inventors over the last century or more, is that it requires that the depth of the body of liquid vary no more than the maximum stroke of the reciprocating apparatus. Storms regularly destroy devices of this sort.

SUMMARY OF THE INVENTION

A preferred wave motion energy harvesting apparatus of the invention comprises a float portion detachably interfitted with and axially moveable with respect to a hydrodynamically resistive portion. The Float portion of this apparatus is moored, but the hydrodynamically resistive portion is neither anchored nor moored except by its being interfitted with the float portion. Both the float and the hydrodynamically resistive portions are separately configured to have their mass distributed evenly about a common vertical axis of the apparatus.

It is an object of the invention to provide a reciprocating wave-motion pump having no tendency to tilt under the influence of gravity, regardless of the degree of extension of the apparatus.

It is a further object of the invention to provide a wave-energy harvesting apparatus that retains a vertically upright attitude independent of wave height.

It is yet a further object of the invention to provide a wave-energy harvesting apparatus that is minimally tilted from a vertically upright attitude when acted on by a lateral current.

It is an additional object of the invention to provide a reciprocating wave-motion pump having a nearly neutrally buoyant float portion comprising an automatically filled water ballast tank.

DESCRIPTION OF THE PREFERRED EMBODIMENT

Figure 1:
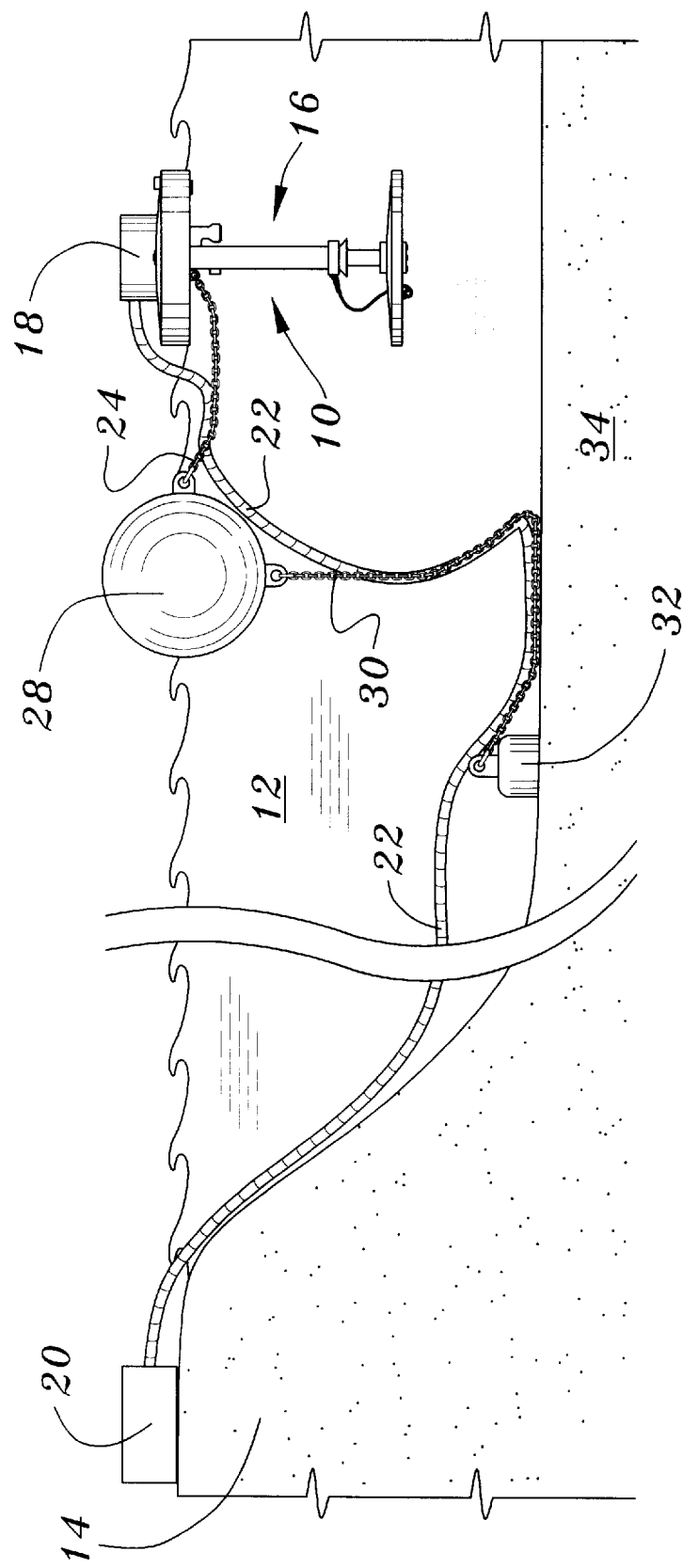
FIG. 1 is a side sectional view showing a preferred mooring arrangement for a wave motion apparatus of the invention.

A wave energy harvesting device 10 of the invention is moored in a body of water 12 adjacent a shore 14. As is known in the wave energy harvesting art, the harvesting device 10 comprises a pump 16 and an optional output converter 18, which may be an electrical generator, a reverse-osmosis water desalination unit, or any of a number of other output devices driven by a stream of water output by the pump 16. In other cases, as is also known in the art, no output converter is used at the pump 16, and the stream of water output from the pump 16 is supplied to an output consuming apparatus 20 (e.g., a known water-driven turbine) on the shore 14. In an aquaculture application the output consuming apparatus 20 may comprise known tanks, plumbing and water circulation apparatus distal from the pump 16. In a desalination application, the output converter 18 may comprise a known reverse osmosis membrane arrangement discharging super-salinated water adjacent the pump 16 and delivering desalinated water via the output line 22 to a drinking water supply system 20 on the shore 14. In all of these applications of the wave-energy harvesting apparatus 10, the stream of pressurized water output from the pump 16 is carried by an output line 22 to a consuming location remote therefrom.

A first portion of the output line 22, adjacent the wave energy harvesting device 10 runs along a tether line 24 extending from a float portion 26 of the pump 16 to a mooring buoy 28—e.g., the two lines 22, 24 may be attached to each other at a plurality of locations by cabling ties, a coaxial webbed sleeve, or other known means so as to avoid problems with the two lines 22, 24 becoming entangled, as would happen if they were not cabled together. In a preferred embodiment, the tether line 24 is longer than the height of the tallest wave that is to be encountered in order to ensure that the tension in the tether line 24 pulls the wave harvesting device 10 in a generally horizontal, rather than in a vertical, direction. During tests of a prototype apparatus 10, for example, the length of the tether line 24 ranged between thirty and forty feet.

The mooring buoy 28 is attached, by means of an anchor line 30, to an anchoring means 32 on the bottom 34 of the body of water 12. In a preferred embodiment, the anchor line 30 is chosen to be about six times as long as the body of water 12 is deep—a length according with marine standards for anchoring a vessel in rough waters. Moreover, the anchor 32 is set far enough away from the shore 14 that there need be no concern about the pump 16 becoming stranded in water too shallow for its operation—i.e., for the pump 16 to operate, the bottom of the pump 16 must be above the bottom 34 of the body of water 12. As with the mooring line 24, the anchor line 30 is attached at a plurality of points to a second portion of the output line 22 so as to prevent tangling. A third portion of the output line 22 extends from the anchor 32 to whatever on-shore apparatus 20 is being fed by the wave energy harvesting machine 10. It may be noted that if the output line 22 is strong enough, it may also function as either or both of the tether line 24 or the anchor line 30, in which case there could be only a single physical line linking the wave harvesting apparatus 10 to the shore 14 or other output-receiving location.

The tether line 24 is preferably attached to a single point 25 on the float portion 26 of the pump 16. This point 25 is as close to the vertical pump axis 36 as is practical in order to minimize the amount of tilting caused by tidal currents. It is noted that it would be more conventional to attach the mooring line 24 at or near the periphery 40 of the float portion 26, an approach that would offer a greater tilting moment when a tidal current acted laterally on the nominally stationary portion 38 of the pump 16. This could lead to excessive tilting of the pump 16 and to a reduction in output. Additional resistance to tilting can be provided by ensuring that the lateral area of the float portion 26 is approximately the same as the lateral area of the hydrodynamically resistive portion 38, where it is understood that the effective area of one or both of these portions 26, 38 may vary somewhat depending on the degree of extension of the pump 16. In experiments on a pump 16, configured as the one depicted in FIG. 2, and having a fully extended overall length of sixteen feet, a tilt of only fifteen degrees from the vertical was measured when the pump 16 operated in a twenty knot tidal current.

Figure 2:
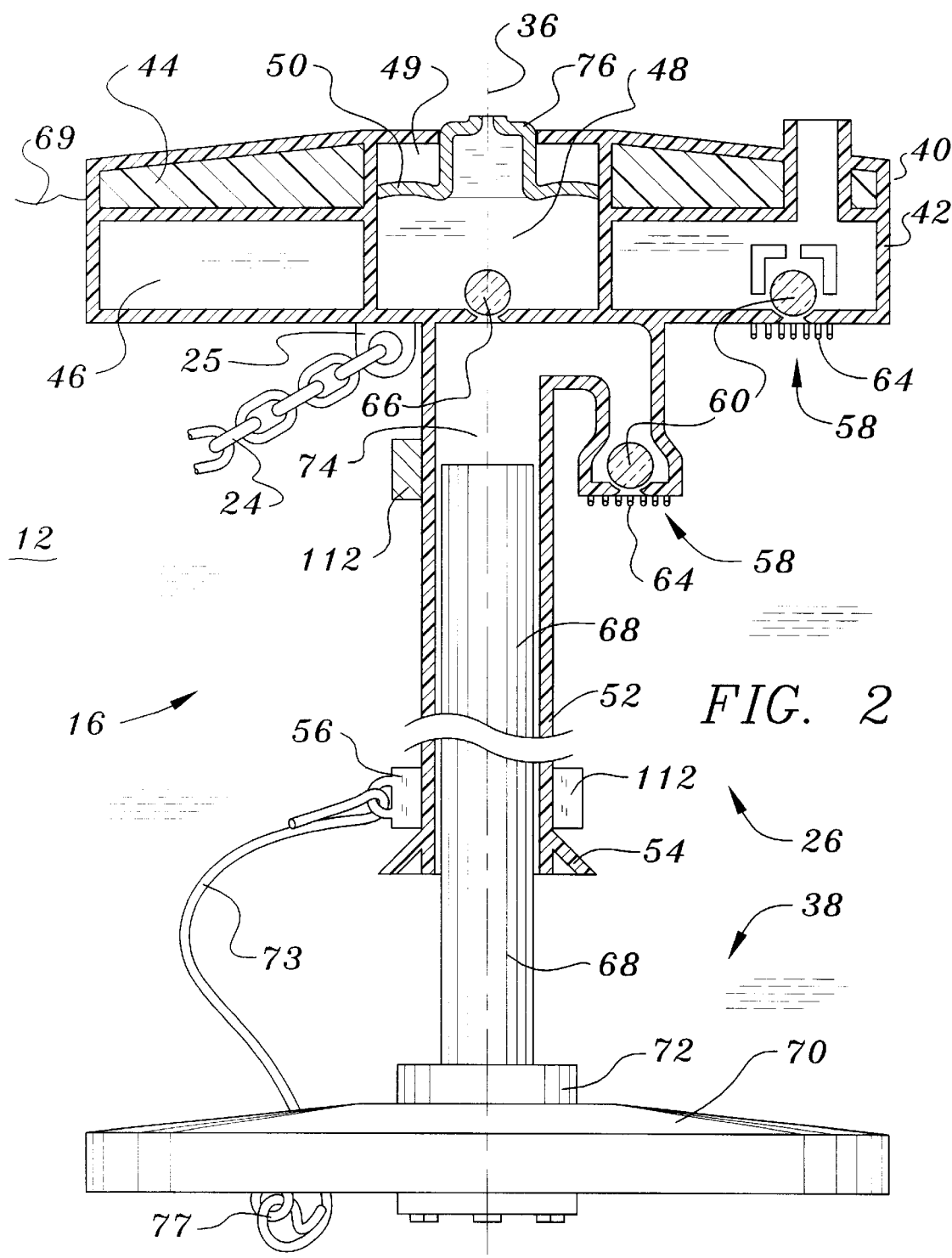
FIG. 2 is a composite side view comprising a cross-section of an upper, float, portion and an elevation of a lower, hydrodynamically resistive, portion of an embodiment of the invention wherein the float portion comprises a cylinder and the hydrodynamically resistive portion comprises a co-acting cylindrical piston.

Although the preferred tethering arrangement, as depicted in FIG. 2, attaches the tether line as closely as possible to the vertical axis 36 of the pump 16, it will be understood that other similar arrangements, such as placing a plurality of eyelets in a circle about the axis 36 and running the tether line 24 through all the eyelets so as to form a bridle (not shown) could also be employed. Tying the tether line 24 to a single attachment point 25 is preferred because of chafing that is to be expected if a bridle arrangement is used.

This preferred mooring arrangement, in which there is no mooring tether 24 directly connected to the stationary portion 38 of the pump 16, differs from those proposed in the prior art, and provides a significantly enhanced resistance to storm damage. Wave motion energy devices that moor both their stationary and wave-motion responsive portions (e.g., as disclosed by Dilliner) can be torn from their moorings during storms when the wave height exceeds their operational limits. A similar problem is encountered with apparatus, such as that taught by Noren, U.S. Pat. No. 4,277,690 having only the stationary portion thereof anchored.

A preferred embodiment of the pump 16 of the invention is depicted in FIG. 2. The upper, float, portion 26 of the pump comprises a generally discoid portion 42 having a floatation chamber 44, a water ballast tank 46 and a pressure tank 48 contained therein. In an exemplar pump 16, the discoid portion 42 was forty two inches in diameter, and had a height at its periphery 40 of seven and one half inches, with a freeboard, in perfectly still water, of approximately two and one half inches.

Proper ballasting of the float portion 26 has been found to be important to the survivability of the pump 16. If the float 26 is too buoyant high waves can destroy the pump 16 by throwing the float out of the water. In a preferred embodiment of the apparatus depicted in FIG. 2, the float unit 26 is ballasted to have an overall specific gravity of 0.8 to 0.85 (e.g., by selecting the volume of the ballast tank 46) and the resistive portion 38 is ballasted so that approximately one half of the length of the piston 68 is above water when the resistive portion 38 is floated separately from the float portion 26. In the tested prototype described supra, the float portion 26 weighed seventy pounds when empty and was ballasted with two hundred thirty pounds of water.

Although a fixed, solid ballasting material such as concrete, iron, or lead could be used in the float unit 16, the preferred embodiment employs a fully flooded tank 46. This choice minimizes the cost of production, as water is the only free ballast. Moreover, this choice reduces both the shipping weight of the apparatus 10 prior to its installation, and the chance of breaking the apparatus 10 by improper on-shore handling techniques. A flooded tank 46 is more reliable than a sealed one, which could develop a leak, allowing water to flow out of the tank when a wave raises the float 26. A leak that introduced air into the tank 46 could lead to the destruction of the apparatus 10 by increasing its buoyancy above the 15–20% level noted hereinbefore. A similar situation could occur if one were to use a completely freely flooded tank 46 (i.e., one having an unrestricted hole in its bottom, rather than having an inlet check valve 58) that could partially drain when wave motion thrust its float portion upward and that would be too buoyant until entrapped air was expelled from it. In the preferred tank 46 an inlet check valve 58 allows water to enter and fully fill the tank 46, but prohibits drainage therefrom. Entrapped air in the tank 46 is expelled to the atmosphere via a vent tube 47 extending from the top of the tank 46 to or above a top surface of the float 26.

A pump cylinder 52 depends from the discoid portion 42 of the float 26 and has a bumper 54 and a line attachment point 56 adjacent its lower end. In the tested embodiment, this pump cylinder 52 is approximately eight feet long and provides a stroke of about six and one half feet. An inlet valve 58, comprising a glass ball 60 disposed on an 0-ring or other suitable valve seat 62 is disposed adjacent the top end of the pump cylinder 52 and is preferably provided with an inlet screen 64 or other filter to prevent seaweed and other debris from entering the pump 16. A one-way outlet valve 66 is disposed between the pump cylinder 52 and the pressure tank 48. Like the inlet valve 58, it preferably comprises a ball 60 and an appropriate valve seat 62. It may be noted that the use of balls 60, e.g., glass marbles, in the check valves 58, 66, permits a design that does not rely on springs or other resilient materials that are subject to wear or corrosion. As is well known in the art, a pressure-regulating air chamber 49 comprising a flexible bladder 50 separating the air and water, is disposed in the pressure tank 48. Although this is depicted in FIG. 2 as comprising a flexible bladder coaxial with the float and attached to the external walls of the pressure chamber 48, it will be understood that many other approaches may be taken and include, inter alia, providing a flexible bladder 50 attached to the wall of the pressure chamber 48 only at a point where the air inflation valve (notshown) passes through to top surface of the float 26.

The lower, nominally stationary portion 38 of the preferred pump 16 comprises a piston 68 attached to a wide plate 70 that, as is known in the wave pump art, provides hydrodynamic resistance to upwardly and downwardly directed forces arising from the motion of the float portion 26 of the pump 16. This resistance is essential in causing the reciprocating motion of the piston 68 relative to the cylinder 52, and assures that the hydrodynamically resistive portion 38 of the pump 16 is at least nominally stationary while the float portion 26 moves responsive to the wave motion. The reciprocating motion of the piston 68 is limited at one extreme when a bumper 54 attached to the float portion 26 hits a cooperating bumper 72 on the stationary portion 38. At the other extreme, the motion is limited by a flexible line 73 secured at one end to a line attachment point 56 on the float, and at the other end 77 to the plate 70. In the tested embodiment, the piston stroke was adjustable by changing the line length to be a maximum of about six and one half feet. In higher power production units, it is expected that the stroke will be increased to twenty five to thirty feet It is well known, when interfitting a piston 68 and cylinder 52 for reciprocating relative motion, to employ piston rings or other sealing means. In the preferred pump 16, no such ancillary sealing means are employed. The piston 68 and cylinder 52 are made of the same material (preferably a polyvinyl chloride that may be coated or sleeved on the wear surfaces with a low friction material, such as a commercially available nylon sleeve). The use of the same material for the piston 68 and cylinder 52 ensures that both will have the same thermal expansion coefficient so that the fit between them will be temperature independent. The outer diameter of the piston 68 is chosen to be between one and three thousandths of an inch less than the inner diameter of the cylinder 52, with a preferred difference in the two diameters being two thousandths of an inch. Although this arrangement may allow some parasitic loss of working fluid around the piston, this has been found to be of no practical concern in a pump 16 operating with an output pressure of as much as one hundred pounds per square inch (gage). To some extent, the cylindrical contact area (e.g., which in the tested model depicted in FIG. 2 ranges between one hundred forty four and five hundred square inches at the two limits of the piston travel ) ensures a high resistance in the parasitic flow path and thereby minimizes loss. One of the clear advantages of the unsealed piston 68 arrangement is that of manufacturing cost. A more significant advantage is that it allows for the exclusion of unlike materials, particularly metallic ones, from the pump chamber, and thereby minimizes corrosion. Perhaps the greatest advantages of this "unrung piston" approach are that it both minimizes friction, which both permits the pump 16 to have a usable output even when there is very little wave motion, and also minimizes wear. One test of this design found no measurable wear after eighty two million pumping strokes.

When the float portion 26 of the pump 16 of FIG. 2 rises vertically responsive to the motion of a wave, the piston 68 moves away from the discoid portion of the pump 16 and water is drawn into the pump chamber 74 through the inlet valve 58. During this portion of the pumping cycle the ball 60 in the outlet valve 66 is drawn onto its seat 62. When the wave crest passes and more of the heavy float portion 26 is initially above water as the wave trough approaches, the float 26 moves downward under the influence of gravity and the rising pressure in the pump chamber 74 opens the outlet valve 66 and forces water from the pump chamber 74 into the pressure tank 48 and thence through an outlet port or nozzle 76 that may feed a known output converter (not shown), or that may be directly connected to an output line (e.g., for circulating water through an aquaculture tank). In experimental models that could be used as a decorative fountain, the pump merely discharged a stream of water into the air, and the height and constancy of the fountain stream were observed as measures of the operation of the pump 16.

Figure 3:
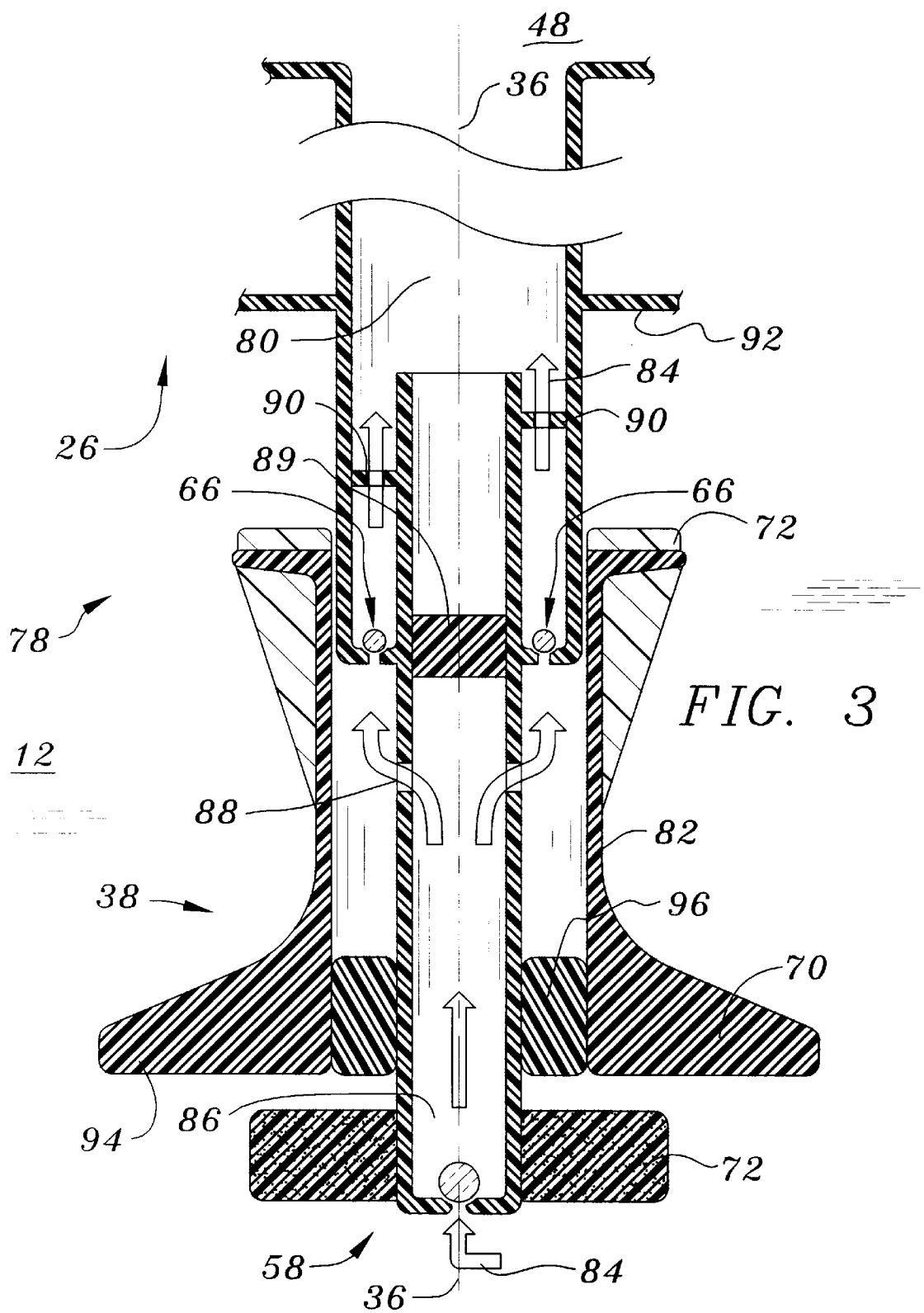
FIG. 3 is a cross-sectional view in a vertical plane of section of an embodiment of the invention wherein the hydrodynamically resistive portion comprises a piston coaxially surrounding an inlet tube portion of the float.

It will be understood that a variety of different pump configurations can be employed in the invention. Turning to FIG. 3, for example, one finds a pump configuration 78 in which the piston 80 is fixedly attached to the float portion 26, and the cylinder 82 comprises a portion of the hydrodynamically resistive portion 38. (It may be noted here that although both the piston 80 and the cylinder 82 in this configuration are geometrically cylindrical shells, the term "piston" is used for the one 80 slideably moving on the inside of the other 82). An inlet valve 58 admits water (the flow path of which is indicated with open arrows 84) into an inner cylinder 86, from whence it flows through ports 88 adjacent the outlet valves 66 and thence to the pressure tank 48. The inner cylinder 86 comprises a plug 89 adjacent the outlet valves 66 to compel the water to flow through the ports 88. The inner cylinder 86 is supported within the piston 80 by neans of a plurality of support pins 90 that do not fully obscure the coaxial space between the two members 80, 86.

In the pump 78 of FIG. 3 the axial reciprocating motion between the float 26 and hydrodynamically resistive portions 38 is limited at both extremes by resilient bumpers 72 that strike cooperating stop surfaces 92, 94 disposed on the float 26 and resistive 38 portions.

Although the pump 78 may have the "ringless" seal described hereinbefore between the piston 80 and cylinder 82, this configuration also requires sealing by a second, bottom, sleeve or bushing 96 between the inner cylinder 86 and the coaxial cylinder 82.

Figure 4:
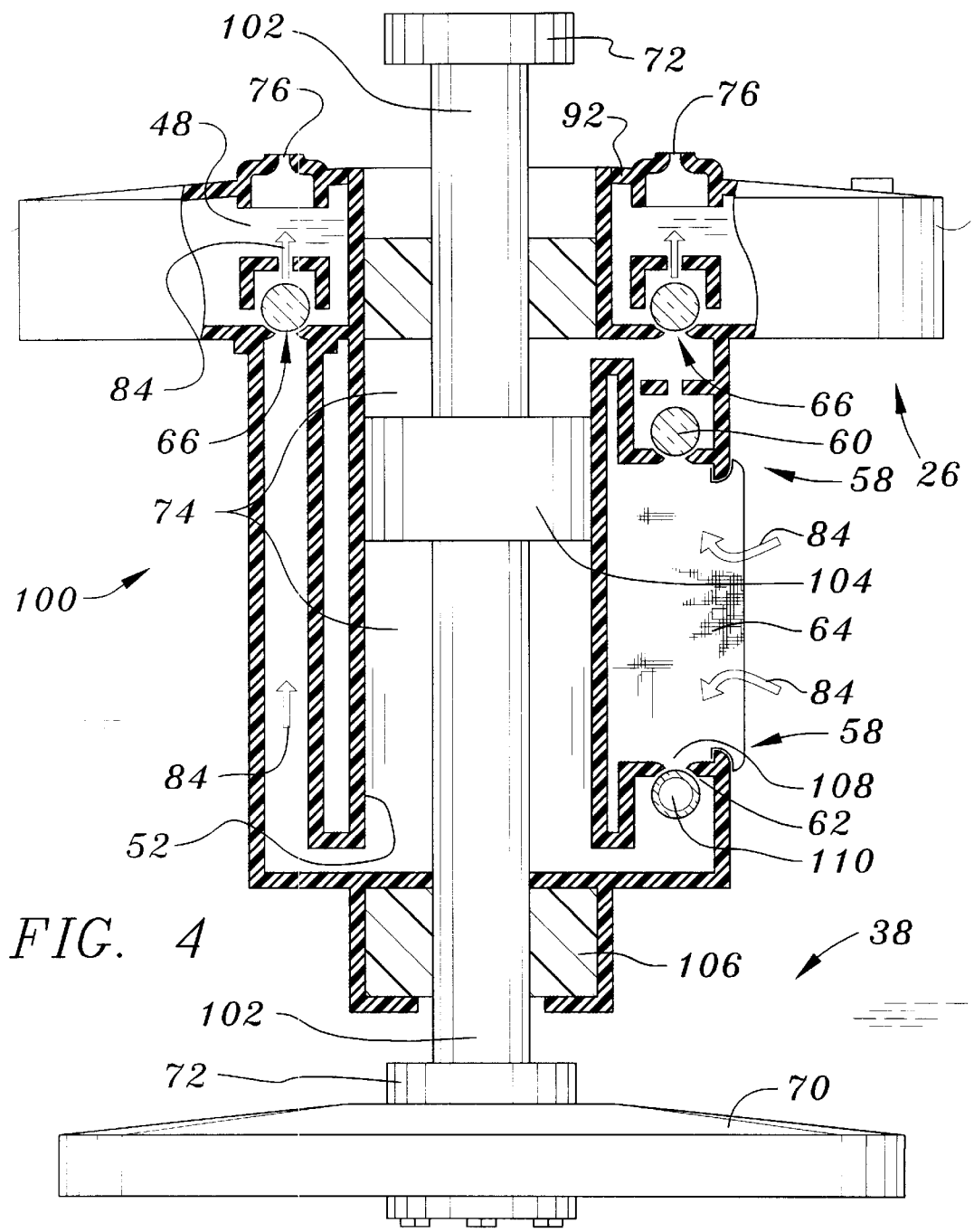
FIG. 4 is a composite side view comprising a partial cross-section of a float portion and an elevation of a hydrodynamically resistive portion of a double-acting embodiment of the invention wherein water is pumped into a pressure tank on both an upward and a downward stroke of a piston.

Although the embodiments depicted in FIGS. 2 and 3 are single-acting piston pumps, it is also possible to use the inventive design approach for a double-acting pump 100, as depicted in FIG. 4. In the double-acting pump 100 two working chambers 74 are defined by the space between a cylinder 52 and a piston rod 102 that is necessarily of smaller diameter than the piston 104. Both the top and bottom ends of the piston rod 102 are sealed by appropriate bushings or glands 106. Water flows into one or the other of the chambers 74 through a respective one of the inlet valves 58 on both the upwardly and the downwardly moving strokes of the piston 104. At the same time, water is forced out of the other of the chambers 74 through its outlet valve 66 into the pressure tank 48. It may be advantageous in a pump 100 having multiple inlet valves 58 to have one of them with an upward facing port 108 that is preferably sealed by means of a floating glass ball 110 cooperating with a valve seat 62. This sealing means avoids the use of a bias spring in a situation where the force of gravity can not be used to hold a valve ball 60, 110 on its seat 62. It will be recognized by those skilled in the art that one could reconfigure any of the depicted pumps to use either floating 110 or sinking 60 valve balls. If this were done in the depiction of FIG. 4, a separate inlet filter 64 would have to be provided for each of the two inlet valves 58.

It may be noted that the in the embodiments depicted in FIGS. 3 and 4 the float 26 and resistive 38 portions of the pump 16 can rotate freely with respect to each other about their common vertical axis 36. Some extent of rotation is also expected of the embodiment of FIG. 2, although it is recognized that the stroke-limiting line 73 also imposes a restraint on rotation. One advantage of permitting rotation between the two major subassemblies 26, 38 is that it avoids preferential wear.

An important feature of each of the embodiments of the invention is that the pumps 16 all comprise a generally vertically oriented axis 36 about which the masses of both the float 26 and resistive 38 portions are symmetrical. That is, the float portion 26, if separated from the resistive portion 38, floats in still water in a normal upright position with the reciprocating axis 36 disposed vertically. Additionally, the resistive portion 38, when separated from the float portion 26, maintains the same normally upright attitude, and, in a preferred embodiment depicted in FIG. 2, floats upright with the upper portion of the piston 68 above the surface 69 of the water. Thus, when the two portions 26,38 are combined, the resulting pump 16 maintains the same normally upright attitude at all stages of its reciprocation. The axial symmetry depicted in FIG. 3 clearly suggests this desired mass balance. Departures from axial symmetry, as suggested in the depiction of FIG. 2, can be compensated for by known means, such as keeping the asymmetrical elements as close to the axis 36 as is practical, by the addition of appropriate counterweights 112, or by choosing a design that balances various materials having different specific gravities.

Although the present invention has been described with respect to several preferred embodiments, many modifications and alterations can be made without departing from the invention. Accordingly, it is intended that all such modifications and alterations be considered as within the spirit and scope of the invention as defined in the attached claims.

I claim:

1. In a wave-driven pump comprising a float portion detachably interfitted with a hydrodynamically resistive portion for reciprocating motion therebetween, the pump adapted to float in a body of water so that the hydrodynamically resistive portion extends beneath a surface region of wave activity and the float portion moves vertically under the influence of wave motion with respect to the hydrodynamically resistive portion, an improvement comprising mooring apparatus, the mooring apparatus comprising:

anchoring means at a bottom of the body of water;

an anchor line extending from the anchoring means to a tether-buoy floating on the surface of the body of water;

a tether line having two ends, the first end of the tether line attached to the tether-buoy, the second end of the tether line attached to the pump adjacent a vertical axis thereof and distal from a periphery of the float.

2. Apparatus for mooring a wave-motion apparatus in a body of water adjacent a shore, the wave-motion apparatus supplying an output through an output line to a location remote therefrom, the wave-motion apparatus comprising a float portion interfitted for reciprocating motion with a hydrodynamically resistive portion, the float and the hydrodynamically resistive portions having a common axis distal from a periphery of the float portion, the mooring apparatus comprising:

anchoring means at a bottom of the body of water;

an anchor line extending from the anchoring means to a tether-buoy floating on the surface of the body of water;

a tether line having two ends, the first end of the tether line attached to the tether-buoy, the second end of the tether line attached to the wave-motion apparatus adjacent the axis and distal from the periphery of the float; and wherein a first portion of the output line is attached to the tether line at a first plurality of locations therealong, a second portion of the output line is attached to the anchor line at a second plurality of locations therealong, and a third portion of the output line extends from the anchoring means to the remote location.

3. The mooring apparatus of claim 2 wherein the anchor line has a length six times a depth of the body of water and the tether line has a length of thirty feet.

4. The mooring apparatus of claim 2 wherein the tether line is attached to the float portion at a single point.

5. In a wave-driven pump comprising a float portion interfitted with a hydrodynamically resistive portion for reciprocating motion therebetween, the pump adapted to float on a body of water so that the float portion moves vertically with respect to the hydrodynamically resistive portion, an improvement wherein the float portion comprises a ballast tank adapted to be flooded by the water, the tank comprising an inlet check valve adjacent a bottom thereof, the inlet check valve adapted to permit the water to flow into the tank and adapted to prohibit the water from flowing out of the tank; and a vent connecting an uppermost portion of the tank to the atmosphere.

6. The wave-driven pump of claim 5 wherein the tank has a volume chosen so that the specific gravity of the float portion is between 0.8 and 0.85, when the tank is flooded with the water.

7. The wave-driven pump of claim 5 wherein the inlet check valve comprises a ball having a density greater than that of the water and a valve seat, the inlet check valve not comprising a spring.

8. The wave-driven pump of claim 5 wherein the float portion and the hydrodynamically resistive portion both comprise masses disposed symmetrically about a common axis that is vertical when the float and the hydrodynamically resistive portions are interfitted and floating in the body of water.

9. The wave-driven pump of claim 5 supplying an output through an output line to a remote location, wherein the float and the hydrodynamically resistive portions have a common axis distal from a periphery of the float portion, and wherein the pump is moored adjacent a shore by mooring apparatus comprising:

anchoring means at a bottom of the body of water;

an anchor line extending from the anchoring means to a tether-buoy floating on the surface of the body of water;

tether line having two ends, the first end of the tether line attached to the tether-buoy, the second end of the tether line attached to the pump adjacent the axis and distal from the periphery of the float; and wherein a first portion of the output line is attached to the tether line at a first plurality of locations therealong; a second portion of the output line is attached to the anchor line at a second plurality of locations therealong; and a third portion of the output line extends from the anchoring means to the remote location.

\* \* \* \* \*